March 17, 1931. W. R. DEGENHARDT ET AL 1,797,024
EXCAVATING OR BORING APPARATUS
Filed June 2, 1928 9 Sheets-Sheet 1

March 17, 1931.  W. R. DEGENHARDT ET AL  1,797,024
EXCAVATING OR BORING APPARATUS
Filed June 2, 1928   9 Sheets-Sheet 3

March 17, 1931. W. R. DEGENHARDT ET AL 1,797,024
EXCAVATING OR BORING APPARATUS
Filed June 2, 1928 9 Sheets-Sheet 6

Patented Mar. 17, 1931

1,797,024

UNITED STATES PATENT OFFICE

WILLIAM RUSSELL DEGENHARDT, OF LONDON, ALLAN FRED DE FRAINE, OF WEMBLEY, AND ROBERT HENRY BICKNELL, DECEASED, LATE OF WESTMINSTER, LONDON, ENGLAND, BY ROBERT ALAN WIMBERLEY BICKNELL, OF LONDON, ENGLAND, AND ARTHUR BICKNELL, OF BIRMINGHAM, ENGLAND, LEGAL REPRESENTATIVES, ASSIGNORS TO THE FRANCOIS CEMENTATION COMPANY LIMITED, OF DONCASTER, ENGLAND, A BRITISH COMPANY

EXCAVATING OR BORING APPARATUS

Application filed June 2, 1928, Serial No. 282,384, and in Great Britain June 14, 1927.

This invention relates to excavating, tunneling or shaft boring apparatus of the general automatically controlled type described in the specification of British Patent No. 238,262 (Bicknell) in which an abrading tool or cutter adapted to remove the material to be bored removes the complete surface of the end of the tunnel or shaft so as to enable the boring apparatus to move steadily forward while the disintegrated material is removed. The tool or cutter is mounted upon a universally pivoted arm which is caused to move to carry the tool over the surface to be disintegrated so that all parts of this surface are successively acted upon within the range of movement of the tool. In the form of apparatus referred to above the said arm (herein termed the tool arm or traversing arm) is moved in a spiral path at constant angular speed with the result that as the tool approaches the central position or minimum radius of action the linear velocity of the said arm decreases. The effect of this is that the number of blows given by the tool per unit length of movement will be fewer at the maximum radius of action and will increase, as the radius of action decreases, so as to reach a maximum at the minimum radius of action; as a result of this the material is removed to a greater extent near the centre of the tunnel than at the periphery during the first cut so as to give the working face of the tunnel the shape of a parabola and it is then necessary, before the apparatus can be moved forward, to bring the working face of the tunnel to the concave spherical shape by moving the tool arm or traversing arm so as to cause the tool to operate several times upon the outer portion of the working face. This leads to a considerable loss in the effective working time of the apparatus and the chief object of the present invention is to equalize the action of the tool over the complete surface so as to cause the work to proceed at a regular rate in the desired direction with all parts of the surface removed to the same depth at each complete cycle of movement so as to avoid the above mentioned loss in the effective working time of the apparatus.

According to this invention the tool is automatically guided over the surface of the work in such a manner that the product of the linear velocity of the tool and its active area is a constant or approximately so, with the result that a constant or approximately constant volume of material is abraded or removed per unit of time. For this purpose the active area of the tool may be maintained constant throughout the operation in which case its linear velocity is made also constant or substantially constant, that is to say the speed of rotation of the tool around the axis of movement is made inversely proportional to the radius of the movement.

To give the required movement of the tool over the surface in the case of constant linear speed, the path employed may be spiral with a constantly varying angular speed of movement inversely proportional to the distance from the central axis that is to say with its minimum angular speed at the periphery and its maximum at or near the centre. Or instead of a spiral path a circular movement may be given to the tool at constant linear speed, the tool, after completing a circle, being moved inwardly or outwardly through the required distance for a second circular cut, successive complete circles being traversed with an angular speed changing at each change of circle to give a rotary speed varying inversely to the radius. Any other suitable continuous path may however be followed by the tool so as to cover the complete face of the tunnel or bore with suitable control which gives the constant linear speed.

To cause the tool to travel in the required path at an angular speed in inverse ratio to the radius of the path, automatic controlling apparatus may be employed which ensures the required linear speed for the tool, either by varying the motor speed or by interposing a variable speed device between the motor and the part driven thereby.

The construction preferred for the control of the path of the tool comprises a rotary member having a radial slot or guide within which lies a sliding block pivotally connected to an extension on the tool arm or traversing arm, the sliding block being connected to a crank pin on a crank. The said crank and the said rotary member are rotated at different speeds, so that the connection to the said extension moves slowly radially as the crank turns, each revolution of the crank causing the tool to make one complete cycle of movement over the working surface, the radius of the path depending upon the position of the sliding block in the slot or guide.

In order that the said invention may be clearly understood and readily carried into effect, the same will now be more fully described with reference to the accompanying drawings, in which:—

Figures 15 and 16 are respectively a side elevation and a plan illustrating in detail the construction and arrangement of the pipes shown in Figures 1 and 4.

Figure 14:
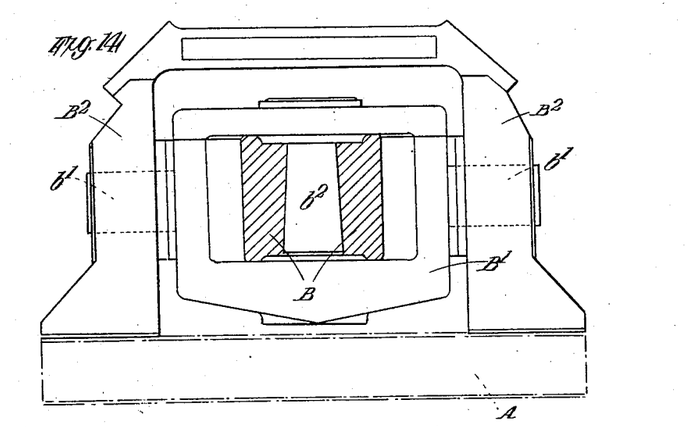
Figure 14 is a sectional end elevation showing how the tool arm or traversing arm is universally pivoted.

Referring to Figures 1 to 5 the excavating apparatus is mounted on a platform A provided with wheels $A^1$, $A^1$—movable on rails $A^2$, $A^2$ which may be in sections built up in front as the tunnel proceeds, the sections being moved from back to front, or the rail track may be maintained and extended, as each suitable length of tunnel is completed, for example at the end of each four feet. The said apparatus comprises a tool arm or traversing arm B universally pivoted to brackets $B^2$ on the platform A and provided at its front end with the abrading tool or cutter $B^3$ which is of the percussive type operated by liquid wave transmission, the liquid being supplied through a suitable system of pipes from generators C, C driven by a motor $C^1$. The universal pivoting of the arm B is effected by means of a frame $B^1$ which has transverse trunnions $b^1$, $b^1$ pivotally mounted in the brackets $B^2$, $B^2$, this frame having a pivot pin $b^2$ on which the arm B can swing laterally. This feature is shown in detail in Figure 14. The motor $C^1$ and generators C, C are carried by a wheeled platform $C^2$ movable on the rails $A^2$, $A^2$ and connected to the rear part of the aforesaid wheeled platform A. The liquid pulsated by the said generators is carried in pipes $C^3$, $C^4$, $C^5$ of which the pipes $C^3$ and $C^5$ are flexibly connected or jointed to the intermediate pipe $C^4$. As the liquid has to pass from the fixed pipe $C^5$ to the tool operating chamber within the tool arm B which has a universal movement as aforesaid and as a completely flexible connection is undesirable, the connection from the pipe $C^5$ to a pipe $C^6$ leading to the operating chamber of the tool is effected through a pair of rotary joints set at right angles to each other and connected by a curved pipe $C^7$, the arrangement forming a universal joint outside the universal joint of the tool arm. This arrangement is shown in detail in Figures 15 and 16 in which $C^{7x}$ is a part of the pipe $C^7$ situated in line with the axis of the aforesaid trunnions $b^1$, $b^1$ and rotatably arranged with respect to the front part of the fixed pipe $C^5$, the said parts being held in position by a collar $C^8$; the other end of the pipe $C^7$ and the rear end of the pipe $C^6$ are also connected together in such a manner that relative angular movement can take place about an axis in line with the axis of the aforesaid pivot pin $b^2$, the said ends of the pipes being held in position by a collar $C^9$.

Figure 6:
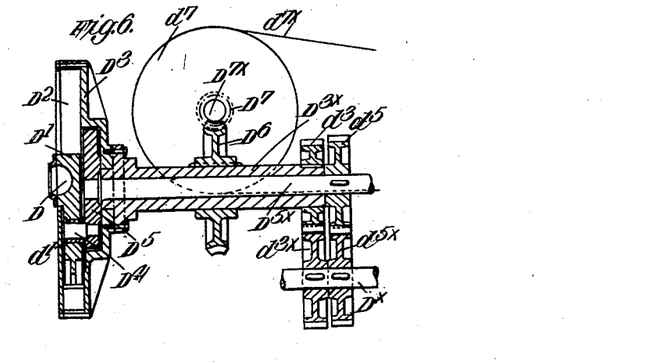
Figure 6 is a section showing the preferred form of the mechanical control of the path of the tool of the preceding figures.
Figure 7:
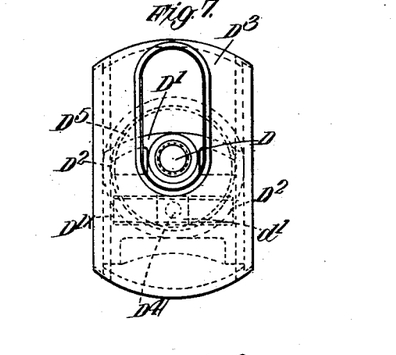
Figure 7 is a side view of Figure 6 viewed from the left.
Figure 8:
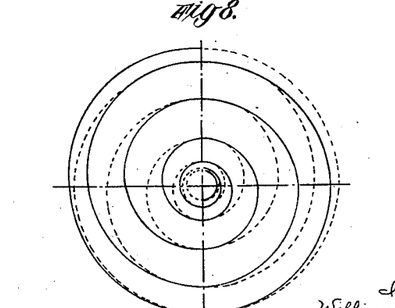
Figure 8 is a diagram illustrating the spiral paths of the connection to the tool arm in Figures 6 and 7.

The rear part or extension of the tool arm B is provided with a counter-weight $B^4$ which may conveniently be built up, in situ, by a succession of lead discs on bushes secured in position by a screwed cap. The rear end of the said tool arm extension slidably carries a ball-shaped member $B^5$ loosely held in a socket D formed in a block $D^1$. This block (see Figures 6 and 7) is mounted to slide in radial guides $D^2$, $D^2$ in a rotary member $D^3$ and is formed with a slot $D^{1x}$ receiving a small block $d^1$ connected to a crank pin $D^4$ on a disc $D^5$. The said member $D^3$ is suitably mounted upon a hollow shaft $D^{3x}$ and the disc $D^5$ has a shaft $D^{5x}$ rotatably mounted in said hollow shaft. The said hollow shaft has a worm wheel $D^6$ meshing with a worm $D^7$ which is mounted on a shaft $D^{7x}$ driven in any suitable manner (for example by a belt $d^{7x}$ and pulleys $d^7$, $d^8$) from a driving motor $D^8$ carried by the aforesaid wheeled platform A. The said hollow shaft carries a gear wheel $d^3$ and the inner shaft $D^{5x}$ carries a gear wheel $d^5$ having one or two more or one or two fewer teeth than the gear wheel $d^3$, these gear wheels meshing with corresponding gear wheels $d^{3\times}$, $d^{5\times}$ suitably mounted upon a lay shaft $D^\times$. Thus when the hollow shaft $D^{3\times}$ is rotated by the motor $D^8$ the member $D^3$ is rotated and the sliding block $D^1$ is given a radial movement so that the ball-shaped member $B^5$ is given the required spiral path of movement. Figure 8 shows this spiral path, the full lines representing the path of movement brought about by the angular displacement of the crank disc $D^5$ on its axis through 180 degrees from the position shown in Figures 6 and 7, and the broken lines representing the path of movement brought about by the angular displacement of the said disc through a further 180 degrees to bring it into its original position.

Figure 9:
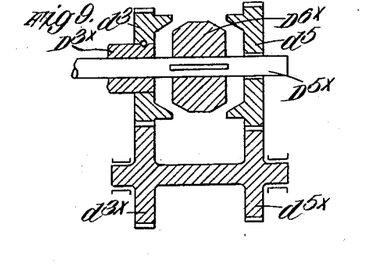
Figure 9 is a sectional view of a modification of Figure 6.

In the modified construction shown in Figure 9 the gear wheel $d^3$ is rigidly connected to the hollow shaft $D^{3\times}$ as aforesaid but the gear wheel $d^5$ is loosely mounted on the inner shaft $D^{5\times}$ and a double clutch member $D^{6\times}$ is slidably keyed on the shaft $D^{5\times}$ between the said gear wheels. When this clutch member is displaced to the right into engagement with the gear wheel $d^5$ the parts operate in the manner previously described. When however the said clutch member is moved to the left into engagement with the gear wheel $d^3$ the shafts $D^{3\times}$ and $D^{5\times}$ are clutched together and the aforesaid sliding block $D^1$ is held fixed in its guides $D^2$, $D^2$ and the motion of the ball-shaped member $B^5$ (and consequently the motion of the tool $B^3$) is circular. When the clutch member $D^{6\times}$ is moved to the neutral position shown in Figure 9 the tool arm B can be adjusted into a new angular position for cutting a circular path of different diameter.

Figure 17:
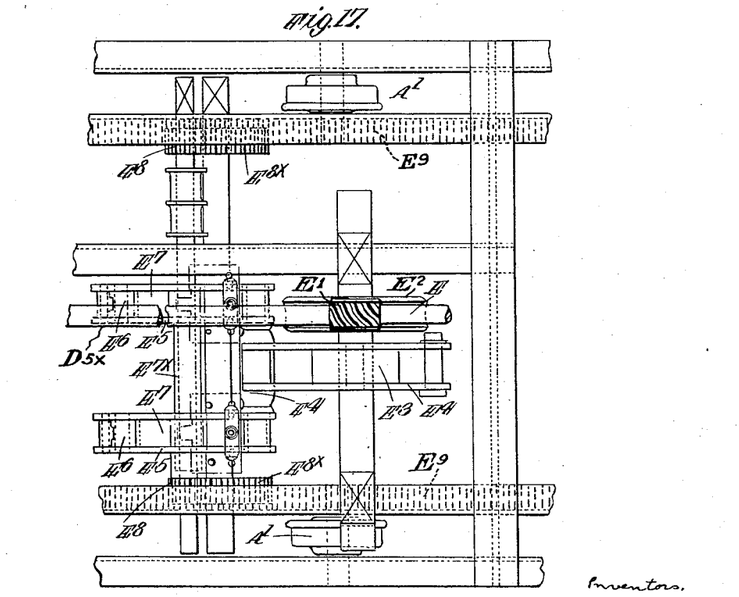
Figure 17 is a view on a larger scale of part of Figure 4, illustrating details not shown in the latter figure.

To feed the aforesaid platform A forward as each layer of ground is disintegrated, a rearward extension E of the aforesaid shaft $D^{5\times}$ driven from the motor $D^8$ through the gear wheels $d^3$, $d^{3\times}$, $d^5$, $d^{5\times}$ is provided with a worm $E^1$ meshing with a worm wheel $E^2$ carrying a cam $E^3$ which, at each complete half cycle, corresponding to one complete operation of the tool over the face of the work, operates upon a roller $E^{4\times}$ on a compensating bar $E^4$ carried by the rear ends of spring controlled levers $E^5$, $E^5$; the front ends of these levers carry pawls $E^6$, $E^6$ engaging ratchet wheels $E^7$, $E^7$ which drive a shaft $E^{7\times}$ carrying pinions $E^8$, $E^8$ on its ends. These pinions mesh with toothed wheels $E^{8\times}$, $E^{8\times}$ which act on racks $E^9$, $E^9$ inside the rails $A^2$, $A^2$. The details of this mechanism are shown in Figure 17. By disengaging the pawls $E^6$, $E^6$ the feed is stopped. The two rails $A^2$, $A^2$ and the racks $E^9$, $E^9$ are mounted on chairs carried by distance bars which are curved when a curved tunnel is being excavated. The shocks occurring during the operation of the tool may be taken by two toggles $E^\times$, $E^\times$ engaging with the crown of the tunnel and by chocks under the wheels $A^1$, $A^1$ of the carriage A.

Figure 1:
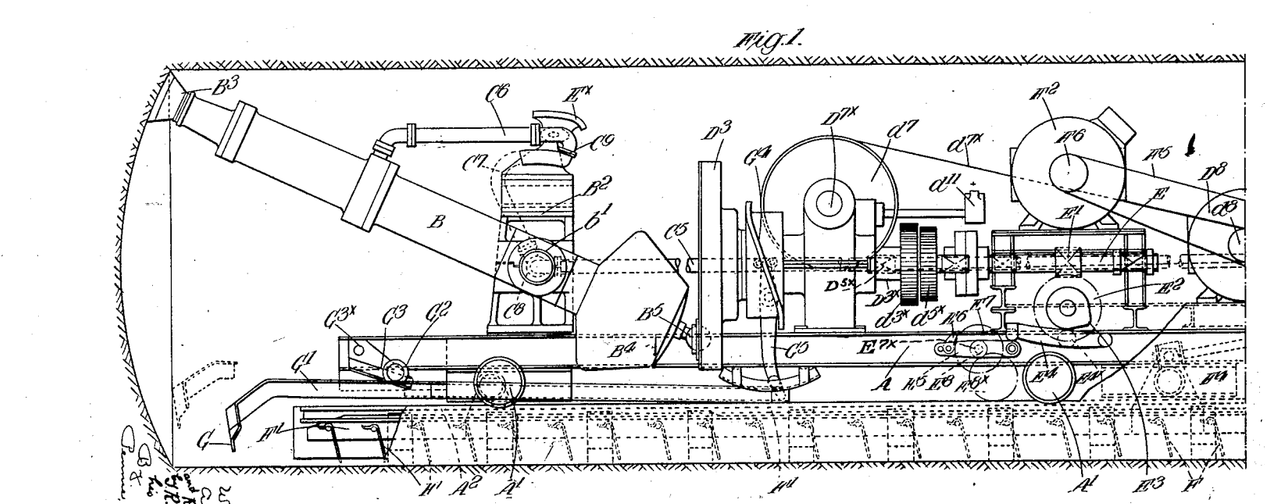
Figure 1 is a side elevation of the front part of apparatus according to this invention in position in a tunnel.
Figure 1D:
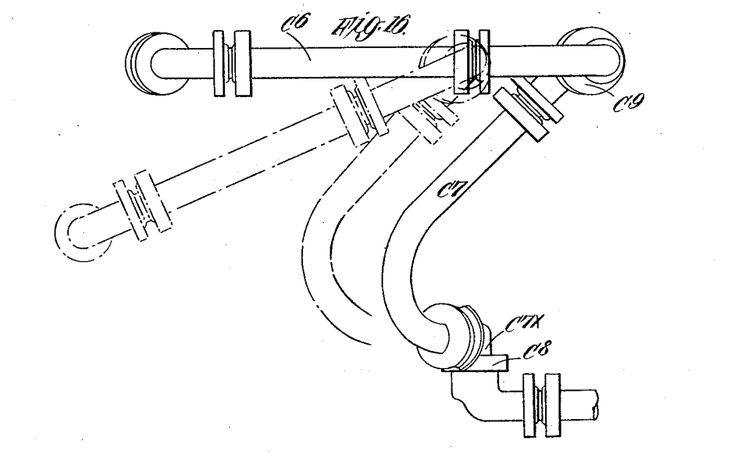
Figure 1E:
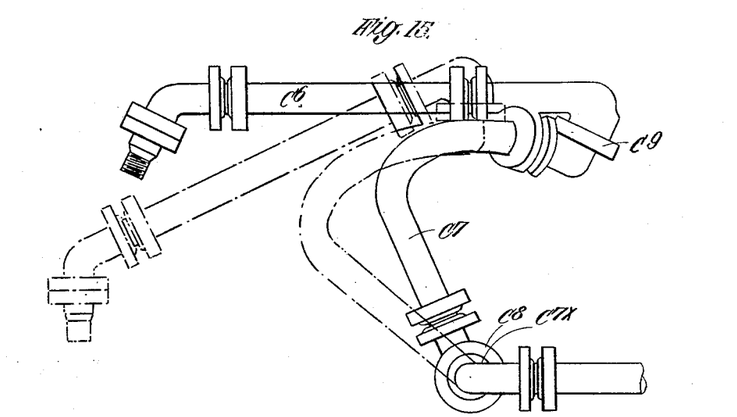
Figure 2:
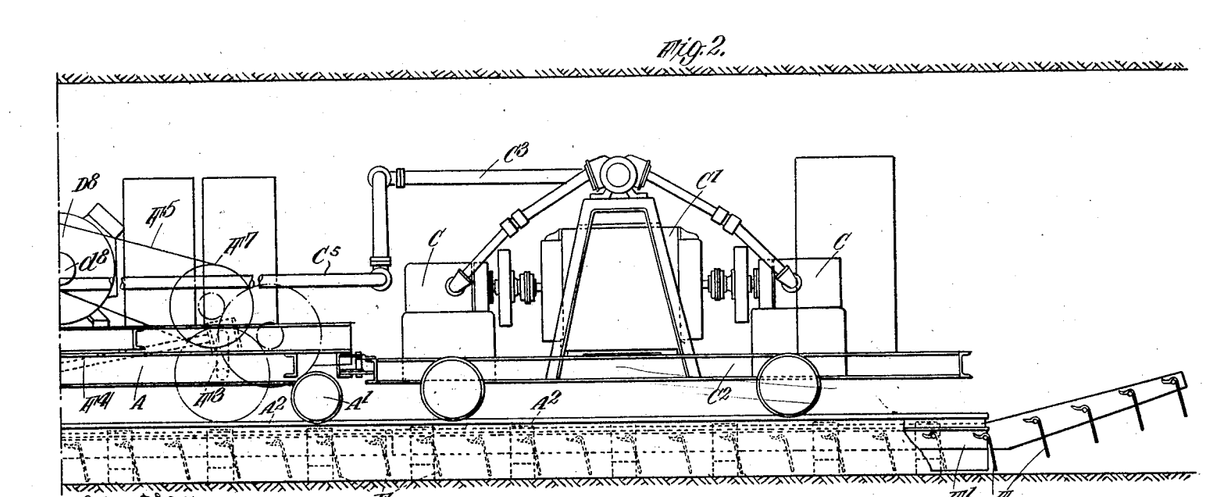
Figure 2 is a side elevation of the rear part of the said apparatus.
Figure 3:
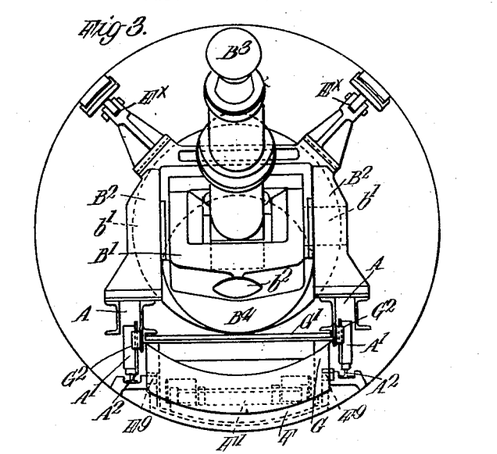
Figure 3 is a front elevation of Figure 1.
Figure 4:
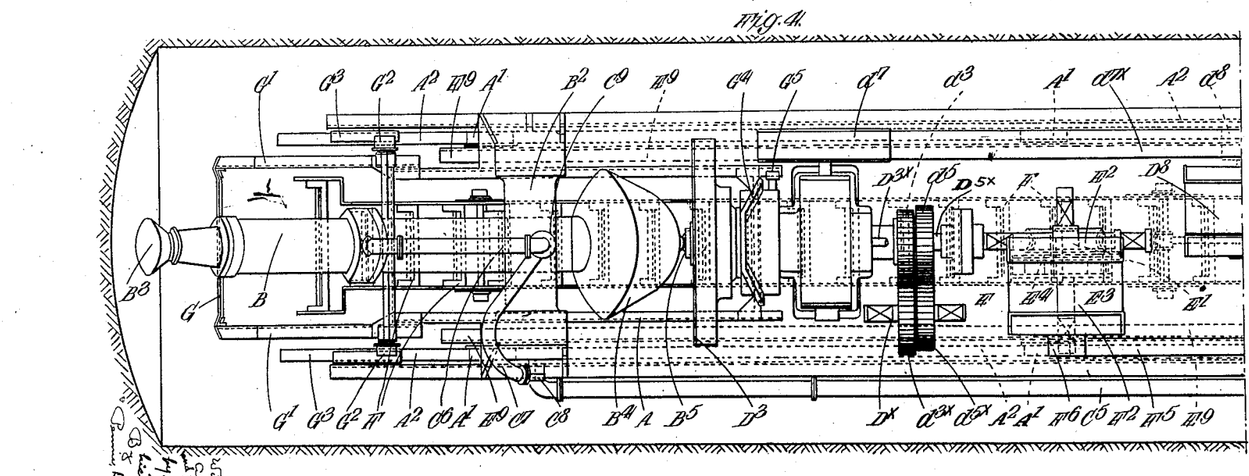
Figure 4 is a plan of Figure 1.
Figure 5:
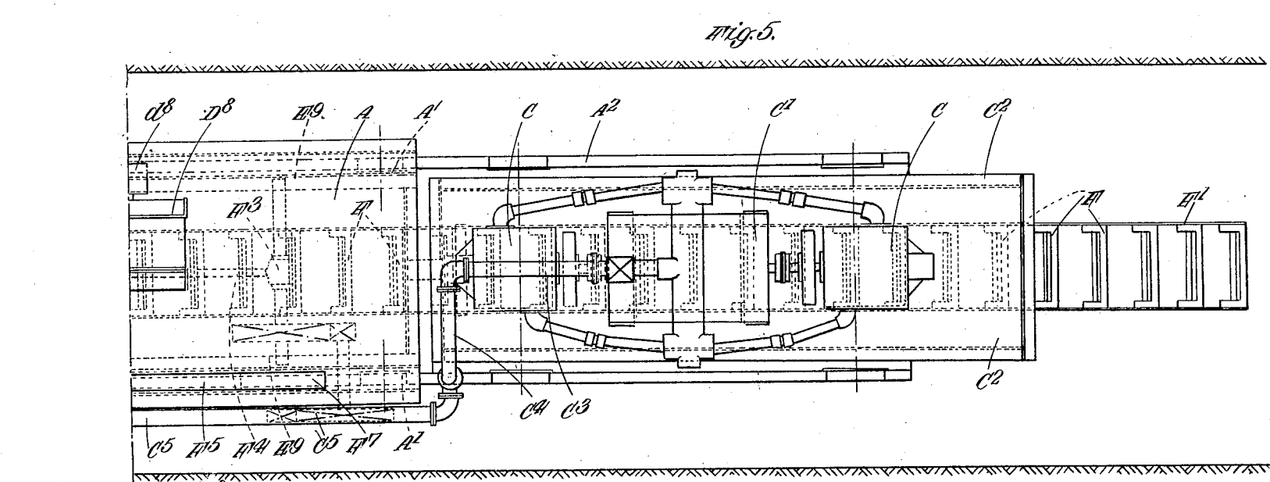
Figure 5 is a plan of Figure 2.

For removing the disintegrated material a conveyor is employed of push-plate type comprising a considerable number of hinged plates F, F—which are carried by reciprocatory members $F^1$, $F^1$ arranged in guides in the lower part of the platform A. During the forward movement these plates are free to swing back so as to pass over the material in front of them, while upon their rearward movement the plates engage the material and scrape it backwards. The conveyor may be arranged in several sections according to the length of tunnelling and may subsequently deliver the material on to a belt conveyor for final removal. The reciprocatory members $F^1$, $F^1$ of the conveyor are reciprocated from a motor $F^2$ carried by the platform A, by means of a crank $F^3$ and a connecting rod $F^4$, the said crank being preferably driven by a belt $F^5$, pulleys $F^6$, $F^7$ and reduction gearing as shown in Figures 2 and 5. The débris is automatically removed from the lower part of the face of the work by a scraper G which delivers it to the conveyor. The scraper is mounted on the forward end of a heavy frame or member $G^1$ having rollers $G^2$, $G^2$ which, when the scraper is moved forward over the heap of débris, rides up inclined members $G^3$ (pivoted at $G^{3\times}$ to the front part of the platform A) until they pass the top, at which point the scraper is near the working face. The scraper and heavy frame then drop suddenly and the scraper penetrates the pile of débris and on the return movement of the frame drags the débris under the front end of the conveyor which carries it away, the rollers $G^2$ passing beneath the members $G^3$ which rock about their pivots $G^{3\times}$ to enable the rollers $G^2$ to reach the original position ready for the next forward movement. The scraper is operated by a cam member $G^4$ moving with the aforesaid member $D^3$ and acting upon a lever $G^5$ connected to the scraper frame, the mechanism being timed so that the scraper when in its forward position is clear of the tool $B^3$.

Figure 10:
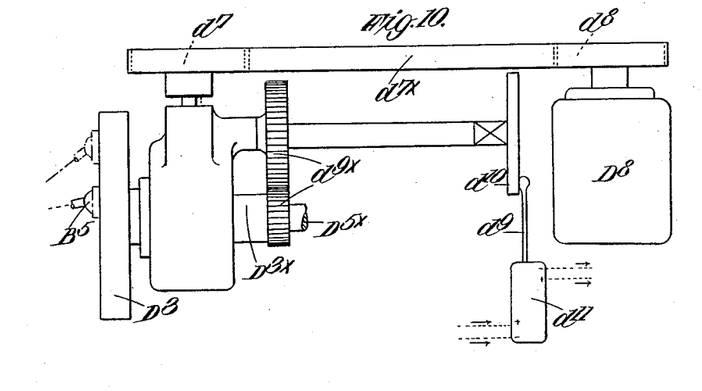
Figure 10 is a diagram showing one way of automatically varying the angular speed of the tool.
Figure 11:
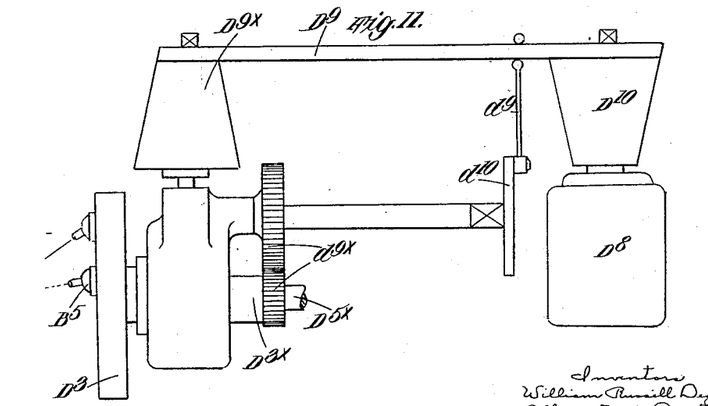
Figure 11 is a view similar to Figure 10 showing a modified arrangement.

The tool $B^3$ has a substantially flat face or a face curved to agree substantially with the curvature of the working face of the tunnel, and in order to attain the aforesaid object of securing that the product of the linear velocity of the tool and its active area is a constant, it is necessary, since the active area of the tool is always the same, to vary the angular speed of the tool so that it moves with constant linear velocity. This is achieved, according to Figures 1 and 10, by automatically varying the speed of the motor $D^8$. In this case, with an electric motor, the movable element of a variable resistance associated with the motor and contained within a casing $d^{11}$ is moved in any suitable manner from the aforesaid hollow shaft $D^{3x}$ of Figure 6 so as to increase the speed of the motor progressively as the radius of action of the tool arm B decreases. In the example shown the said movable element is connected to a member $d^9$ operated by a crank $d^{10}$ which is driven from the hollow shaft $D^{2x}$ through a gear $d^{9x}$ having a ratio dependent upon the number of spirals made by the tool during each cycle of operations. A similar result is obtained, according to Figure 11, by driving the hollow shaft $D^{3x}$ from the motor $D^8$ through a belt $D^9$ and conical or tapered pulleys $D^{9x}$ and $D^{10}$. The belt is moved into different positions on the said pulleys by means of the member $d^9$ operated by the crank $d^{10}$ as aforesaid. In the position of the belt shown, the shaft $D^{3x}$ is driven at maximum speed corresponding to the minimum radius of action of the tool and as this radius is increased the speed of the shaft is decreased owing to the belt $D^9$ being moved to bring it on to a larger part of the pulley $D^{9x}$ and a smaller part of the pulley $D^{10}$. By suitably arranging the angle or taper of the pulleys it can be ensured that the linear speed of the tool is constant which is necessary as explained above. Any other suitable device may be employed for varying the speed of the shaft $D^{3x}$, such as elliptical gears.

Figure 12:
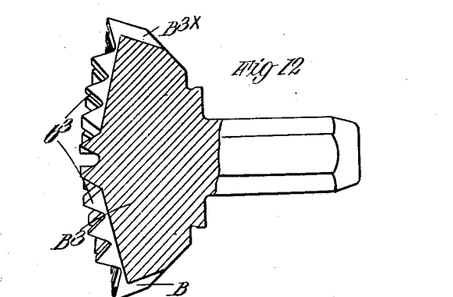
Figures 12 and 13 are sectional and face views of the tool shown in Figure 1.
Figure 13:
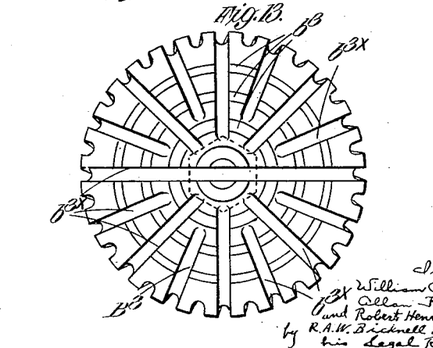

In the particular construction of tool shown by Figures 12 and 13, the operating surface is constituted by a series of somewhat sharp annular wedges or angular ridges $b^3$ with deep radial or diametrical slots $b^{3x}$ which serve for clearing the disintegrated material and terminate in peripheral notches through which the material escapes, the angles of clearness and cutting being calculated according to the nature of the work. The radial clearing slots may be alternately of differing depths. The tool is also formed with a peripheral cutting or abrading edge $B^{3x}$ by coning the peripheral face of the tool and continuing the radial slots through the peripheral face. The edge thus formed acts upon the peripheral surface of the tunnel or shaft, when the tool is at the edge of its work.

The tunnel may be formed circular, elliptical or of any other desired cross section according as the tool is controlled. The action may be directed at an angle to the direction of the tunnel, in which case a circular operation of the cutter would give an elliptical tunnel and the walls of the tunnel might take the whole or part of the shock of the operation thus isolating the machinery from shock. An angle of about 45° could be used for this purpose.

What we claim and desire to secure by Letters Patent of the United States is:—

1. Excavating, tunnelling or shaft boring apparatus comprising an abrading tool, and means for moving said tool over the surface to be disintegrated, in such a manner that the product of the linear velocity of the tool and its active area is substantially a constant.

2. Excavating, tunnelling or shaft boring apparatus comprising an abrading tool having a constant active area, and means for moving said tool at a substantially constant linear velocity over the surface to be disintegrated.

3. Excavating, tunnelling or shaft boring apparatus comprising an abrading tool, means for moving said tool about an axis corresponding to the axis of the tunnel or shaft to be bored, means for varying the radial distance of said tool from said axis, and means for causing the angular rate of movement of the tool to be inversely proportional to the radial distance.

4. Excavating, tunnelling or shaft boring apparatus, comprising an abrading tool, an arm carrying said tool, a universal pivot for said arm, means for operating said arm so as to cause the tool to move in a spiral path over the surface to be disintegrated, and means for causing the linear speed of movement of said tool to be substantially constant.

5. Excavating, tunnelling or shaft boring apparatus comprising an abrading tool, an arm carrying said tool, a universal pivot for said arm, a motor for operating said arm so as to cause the tool to move in a spiral path over the surface to be disintegrated, and means for automatically varying the speed of said motor so as to cause the linear speed of movement of said tool to be substantially constant.

6. Excavating, tunnelling or shaft boring apparatus, comprising an abrading tool, an arm carrying said tool, a universal pivot for said arm, a motor for operating said arm so as to cause the tool to move in a spiral path over the surface to be disintegrated, a variable speed device interposed between said motor and said arm, and means for automatically operating said device in order to cause the linear speed of movement of said tool to be substantially constant.

7. Excavating, tunnelling or shaft boring apparatus comprising an abrading tool, an arm carrying said tool, a universal pivot for said arm, a motor, a rotary member driven from the motor and provided with a radial guide slot, a sliding block disposed in the said guide slot and pivotally connected to an extension of the arm carrying the tool, a crank arranged with its axis of rotation coaxial with that of said rotary member the pin of said crank being connected to the sliding block, and means for rotating the rotary member and the crank at different speeds.

8. Excavating, tunnelling or shaft boring apparatus comprising an abrading tool, an arm carrying said tool, a universal pivot for said arm, a motor, a rotary member driven from the motor and provided with a radial guide slot, a sliding block disposed in the said guide slot and pivotally connected to an extension of the arm carrying the tool, a crank arranged with its axis of rotation coaxial with that of said rotary member the pin of said crank being connected to the sliding block, gear wheels having different numbers of teeth, one of these gear wheels being driven with said rotary member and the other driving said crank, and connected gear wheels on a lay shaft, the latter gear wheels meshing with the former gear wheels in order to drive the rotary member and the crank at different speeds.

9. Excavating, tunnelling or shaft boring apparatus comprising an abrading tool, an arm carrying said tool, a universal pivot for said arm, a motor, a rotary member driven from the motor and provided with a radial guide slot, a sliding block disposed in the said guide slot and pivotally connected to an extension of the arm carrying the tool, a crank arranged with its axis of rotation co-axial with that of said rotary member the pin of said crank being connected to the sliding block, a hollow shaft connected to said rotary member, an inner shaft connected to said crank, gear wheels having different numbers of teeth, means for rigidly connecting one of said gear wheels to one of said shafts and for loosely mounting the other gear wheel on the other shaft, a double clutch interposed between said gear wheels, means for slidably connecting said clutch to the shaft on which the second gear wheel is loosely mounted, and two connected gear wheels meshing with the first-mentioned two gear wheels.

10. Excavating, tunnelling or shaft boring apparatus comprising in combination with the elements recited in claim 1, a member carrying said tool, a wheeled platform carrying said member, a motor carried by said platform, and a device operated by said motor, for automatically moving said platform forward as the work progresses.

11. Excavating, tunnelling or shaft boring apparatus comprising a percussive abrading tool, a member carrying said tool, means for operating said member so as to cause the tool to move over the surface to be disintegrated, a platform carrying said member, a heavy reciprocatory frame, pivoted members on said platform said members being inclined upwardly toward the front, rollers on said frame for riding up said members during the forward movement of the frame until the rollers pass over the ends of said members, whereupon the frame drops by gravity, said rollers cooperating with the lower surface of said members during the rearward movement of said frame to rock said members about their pivots, and a scraper mounted on the front end of said reciprocatory frame.

12. Excavating, tunnelling or shaft boring apparatus comprising in combination with the elements claimed in claim 11, a motor for moving the tool member, and means driven from said motor for reciprocating the frame in correct time relationship to the movements of said tool member.

13. Excavating, tunnelling or shaft boring apparatus comprising in combination with the elements claimed in claim 11, a motor for operating the tool member, and a cam driven from said motor for reciprocating the frame in correct time relationship to the movements of the tool member.

14. Excavating, tunnelling or shaft boring apparatus comprising a percussive abrading tool operated by liquid wave transmission, an arm carrying said tool, a universal pivot for said arm, means for operating said arm so as to cause the tool to move over the surface to be disintegrated, and an arrangement of pivoted pipes forming a universal joint which is situated outside the universal pivot of said arm and has its axis of movement coincident with the axis of movement of said universal pivot, said pipes carrying the liquid for operating the tool.

WILLIAM RUSSELL DEGENHARDT.
ALLAN FRED de FRAINE.
ROBERT ALAN WIMBERLEY BICKNELL,
ARTHUR BICKNELL,
Administrators of Robert Henry Bicknell, deceased.